United States Patent
Ang et al.

(10) Patent No.: US 11,019,612 B2
(45) Date of Patent: May 25, 2021

(54) HARQ-ACK REPORTING FOR DOWNLINK COMMUNICATIONS INCLUDED IN MULTIPLE DOWNLINK ASSOCIATION SETS

(71) Applicant: QUALCOMM Incorporated, San Diego, CA (US)

(72) Inventors: Peter Pui Lok Ang, San Diego, CA (US); Xiao Feng Wang, San Diego, CA (US); Heechoon Lee, San Diego, CA (US); Huilin Xu, San Diego, CA (US); Peter Gaal, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/406,434

(22) Filed: May 8, 2019

(65) Prior Publication Data

US 2019/0349899 A1 Nov. 14, 2019

Related U.S. Application Data

(60) Provisional application No. 62/670,517, filed on May 11, 2018.

(51) Int. Cl.
*H04W 72/04* (2009.01)
*H04L 5/00* (2006.01)
*H04L 1/18* (2006.01)

(52) U.S. Cl.
CPC ......... *H04W 72/042* (2013.01); *H04L 1/1812* (2013.01); *H04L 5/0055* (2013.01); *H04W 72/0446* (2013.01)

(58) Field of Classification Search
CPC ............ H04W 72/042; H04W 72/0446; H04L 1/1812; H04L 1/1854; H04L 1/1861; H04L 1/1858; H04L 5/0055; H04L 5/0005
See application file for complete search history.

(56) References Cited

U.S. PATENT DOCUMENTS

| 2011/0194500 A1* | 8/2011 | Kim ................ H04L 1/1854 370/328 |
| 2017/0280430 A1* | 9/2017 | Yin .................. H04W 76/16 |
| 2018/0019843 A1* | 1/2018 | Papasakellariou .... H04L 5/0055 |

OTHER PUBLICATIONS

Corrections on CA operation Samsung 3GPP R1-1804381 (Year: 2018).*

(Continued)

*Primary Examiner* — Rina C Pancholi

(74) *Attorney, Agent, or Firm* — Harrity & Harrity, LLP/Qualcomm

(57) ABSTRACT

Various aspects of the present disclosure generally relate to wireless communication. In some aspects, a user equipment (UE) may determine that a received physical downlink shared channel (PDSCH) communication is included in multiple downlink association sets, wherein hybrid automatic repeat request acknowledgement (HARQ-ACK) information for different downlink association sets is to be reported in different slots; report a valid HARQ-ACK in a first slot indicated by a PDSCH-to-HARQ feedback timing value associated with the PDSCH communication; and selectively report the valid HARQ-ACK, corresponding to the PDSCH communication, or a negative acknowledgement (NACK) in a second slot based at least in part on whether the second slot occurs before or after the first slot, wherein the second slot is to be used for reporting HARQ-ACK information associated with a downlink association set of the multiple downlink association sets. Numerous other aspects are provided.

21 Claims, 11 Drawing Sheets

(56) References Cited

OTHER PUBLICATIONS

International Search Report and Written Opinion—PCT/US2019/031547—ISA/EPO—dated Aug. 12, 2019.
Nokia et al., "On Remaining Aspects of NR CNDC and BWPs", 3GPP TSG-RAN WG1 Meeting NRAH #3, 3GPP Draft; R1-1715755 On Remaining Aspects of NR CNDC and BWPs, 3rd Generation Partnership Project (3GPP), Mobile Competence Centre, 650, Route Des Lucioles ; F-06921 Sophia-Antipolis Cedex, France, vol. RAN WG1, No. Nagoya, Japan; Sep. 18, 2017-Sep. 21, 2017, Sep. 17, 2017 (Sep. 17, 2017), 13 Pages, XP051339217, Retrieved from the Internet: URL: http://www.3gpp.org/ftp/Meetings_3GPP_SYNC/RAN1/Docs/ [retrieved on Sep. 17, 2017].
Samsung: "Corrections on CA Operation", 3GPP TSG RAN WG1 Meeting #92bis, 3GPP Draft; R1-1804381_CA, 3rd Generation Partnership Project (3GPP), Mobile Competence Centre, 650, Route Des Lucioles; F-06921 Sophia-Antipolis Cedex, France, vol. RAN WG1, No. Sanya, China; Apr. 16, 2018-Apr. 20, 2018, Apr. 15, 2018 (Apr. 15, 2018), pp. 1-5, XP051426666, Retrieved from the Internet: URL: http://www.3gpp.org/ftp/Meetings_3GPP_SYNC/RAN1/Docs/ [retrieved on Apr. 15, 2018].
Samsung: "Corrections on HARQ Feedback", 3GPP TSG RAN WG1 #AH 1801, 3GPP Draft; R1-1800453 HARQ Feedback, 3rd Generation Partnership Project (3GPP), Mobile Competence Centre, 650, Route Des Lucioles, F-06921 Sophia-Anti Polis Cedex, France, vol. RAN WG1, No. Vancouver, Canada; Jan. 22, 2018-Jan. 26, 2018, Jan. 13, 2018, pp. 1-9, XP051384879, Retrieved from the Internet: URL: http://www.3gpp.org/ftp/tsg_ran/WG1_RL1/TSGR1_AH/NR_AH_1801/Docs/ [retrieved on Jan. 13, 2018].

\* cited by examiner

HARQ-ACK REPORTING FOR DOWNLINK COMMUNICATIONS INCLUDED IN MULTIPLE DOWNLINK ASSOCIATION SETS

CROSS-REFERENCE TO RELATED APPLICATIONS UNDER 35 U.S.C. § 119

This application claims priority to U.S. Provisional Patent Application No. 62/670,517, filed on May 11, 2018, entitled "TECHNIQUES AND APPARATUSES FOR HARQ-ACK REPORTING FOR DOWNLINK COMMUNICATIONS INCLUDED IN MULTIPLE DOWNLINK ASSOCIATION SETS," which is hereby expressly incorporated by reference herein.

FIELD OF THE DISCLOSURE

Aspects of the present disclosure generally relate to wireless communication, and more particularly to techniques and apparatuses for hybrid automatic repeat request acknowledgement (HARQ-ACK) reporting for downlink communications included in multiple downlink association sets.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining that a received physical downlink shared channel (PDSCH) communication is included in multiple downlink association sets, wherein hybrid automatic repeat request acknowledgement (HARQ-ACK) information for different downlink association sets is to be reported in different slots; reporting a valid HARQ-ACK in a first slot indicated by a PDSCH-to-HARQ feedback timing value associated with the PDSCH communication; and selectively reporting the valid HARQ-ACK, corresponding to the PDSCH communication, or a negative acknowledgement (NACK) in a second slot based at least in part on whether the second slot occurs before or after the first slot, wherein the second slot is to be used for reporting HARQ-ACK information associated with a downlink association set of the multiple downlink association sets.

In some aspects, a UE for wireless communication may include memory and one or more processors operatively coupled to the memory. The memory and the one or more processors may be configured to determine that a received PDSCH communication is included in multiple downlink association sets, wherein HARQ-ACK information for different downlink association sets is to be reported in different slots; report a valid HARQ-ACK in a first slot indicated by a PDSCH-to-HARQ feedback timing value associated with the PDSCH communication; and selectively report the valid HARQ-ACK, corresponding to the PDSCH communication, or a NACK in a second slot based at least in part on whether the second slot occurs before or after the first slot, wherein the second slot is to be used for reporting HARQ-ACK information associated with a downlink association set of the multiple downlink association sets.

In some aspects, a non-transitory computer-readable medium may store one or more instructions for wireless communication. The one or more instructions, when executed by one or more processors of a UE, may cause the one or more processors to determine that a received PDSCH communication is included in multiple downlink association sets, wherein HARQ-ACK information for different downlink association sets is to be reported in different slots; report a valid HARQ-ACK in a first slot indicated by a PDSCH-to-HARQ feedback timing value associated with the PDSCH communication; and selectively report the valid HARQ-ACK, corresponding to the PDSCH communication, or a NACK in a second slot based at least in part on whether the second slot occurs before or after the first slot, wherein the second slot is to be used for reporting HARQ-ACK information associated with a downlink association set of the multiple downlink association sets.

In some aspects, an apparatus for wireless communication may include means for determining that a received PDSCH communication is included in multiple downlink association sets, wherein HARQ-ACK information for different downlink association sets is to be reported in different slots; means for reporting a valid HARQ-ACK in a first slot indicated by a PDSCH-to-HARQ feedback timing value associated with the PDSCH communication; and means for selectively reporting the valid HARQ-ACK, corresponding to the PDSCH communication, or a NACK in a second slot based at least in part on whether the second slot occurs before or after the first slot, wherein the second slot is to be used for reporting HARQ-ACK information associated with a downlink association set of the multiple downlink association sets.

In some aspects, a method of wireless communication, performed by a UE, may include setting a value in HARQ-ACK information to indicate a valid HARQ-ACK, corresponding to a PDSCH communication, or a NACK based at least in part on a PDSCH-to-HARQ feedback timing value associated with the PDSCH communication; and transmitting the value in the HARQ-ACK information.

In some aspects, a UE for wireless communication may include memory and one or more processors operatively coupled to the memory. The memory and the one or more processors may be configured to set a value in HARQ-ACK information to indicate a valid HARQ-ACK, corresponding to a PDSCH communication, or a NACK based at least in part on a PDSCH-to-HARQ feedback timing value associated with the PDSCH communication; and transmit the value in the HARQ-ACK information.

In some aspects, a non-transitory computer-readable medium may store one or more instructions for wireless communication. The one or more instructions, when executed by one or more processors of a UE, may cause the one or more processors to set a value in HARQ-ACK information to indicate a valid HARQ-ACK, corresponding to a PDSCH communication, or a NACK based at least in part on a PDSCH-to-HARQ feedback timing value associated with the PDSCH communication; and transmit the value in the HARQ-ACK information.

In some aspects, an apparatus for wireless communication may include means for setting a value in HARQ-ACK information to indicate a valid HARQ-ACK, corresponding to a PDSCH communication, or a NACK based at least in part on a PDSCH-to-HARQ feedback timing value associated with the PDSCH communication; and means for transmitting the value in the HARQ-ACK information.

In some aspects, a method of wireless communication, performed by a base station, may include receiving a NACK in HARQ-ACK information, wherein the NACK corresponds to a PDSCH communication included in multiple downlink association sets; determining a first slot indicated by a PDSCH-to-HARQ feedback timing value associated with the PDSCH communication; and selectively triggering retransmission of the PDSCH communication based at least in part on a timing of a second slot, in which the HARQ-ACK information is received, relative to the first slot.

In some aspects, a base station for wireless communication may include memory and one or more processors operatively coupled to the memory. The memory and the one or more processors may be configured to receive a NACK in HARQ-ACK information, wherein the NACK corresponds to a PDSCH communication included in multiple downlink association sets; determine a first slot indicated by a PDSCH-to-HARQ feedback timing value associated with the PDSCH communication; and selectively trigger retransmission of the PDSCH communication based at least in part on a timing of a second slot, in which the HARQ-ACK information is received, relative to the first slot.

In some aspects, a non-transitory computer-readable medium may store one or more instructions for wireless communication. The one or more instructions, when executed by one or more processors of a base station, may cause the one or more processors to receive a NACK in HARQ-ACK information, wherein the NACK corresponds to a PDSCH communication included in multiple downlink association sets; determine a first slot indicated by a PDSCH-to-HARQ feedback timing value associated with the PDSCH communication; and selectively trigger retransmission of the PDSCH communication based at least in part on a timing of a second slot, in which the HARQ-ACK information is received, relative to the first slot.

In some aspects, an apparatus for wireless communication may include means for receiving a NACK in HARQ-ACK information, wherein the NACK corresponds to a PDSCH communication included in multiple downlink association sets; means for determining a first slot indicated by a PDSCH-to-HARQ feedback timing value associated with the PDSCH communication; and means for selectively triggering retransmission of the PDSCH communication based at least in part on a timing of a second slot, in which the HARQ-ACK information is received, relative to the first slot.

In some aspects, a method of wireless communication, performed by a base station, may include determining that a PDSCH communication, to be scheduled by the base station, is associated with a plurality of downlink association sets corresponding to a plurality of PDSCH-to-hybrid automatic repeat request (HARD) feedback timing values that each indicate a different slot for reporting HARQ-ACK information for a downlink association set of the plurality of downlink association sets; determining a minimum PDSCH-to-HARQ feedback timing value of the plurality of PDSCH-to-HARQ feedback timing values; and signaling, to a UE, the minimum PDSCH-to-HARQ feedback timing value in association with scheduling the PDSCH communication.

In some aspects, a base station for wireless communication may include memory and one or more processors operatively coupled to the memory. The memory and the one or more processors may be configured to determine that a PDSCH communication, to be scheduled by the base station, is associated with a plurality of downlink association sets corresponding to a plurality of PDSCH-to-HARQ feedback timing values that each indicate a different slot for reporting HARQ-ACK information for a downlink association set of the plurality of downlink association sets; determine a minimum PDSCH-to-HARQ feedback timing value of the plurality of PDSCH-to-HARQ feedback timing values; and signal, to a UE, the minimum PDSCH-to-HARQ feedback timing value in association with scheduling the PDSCH communication.

In some aspects, a non-transitory computer-readable medium may store one or more instructions for wireless communication. The one or more instructions, when executed by one or more processors of a base station, may cause the one or more processors to determine that a PDSCH communication, to be scheduled by the base station, is associated with a plurality of downlink association sets corresponding to a plurality of PDSCH-to-HARQ feedback timing values that each indicate a different slot for reporting HARQ-ACK information for a downlink association set of the plurality of downlink association sets; determine a minimum PDSCH-to-HARQ feedback timing value of the plurality of PDSCH-to-HARQ feedback timing values; and signal, to a UE, the minimum PDSCH-to-HARQ feedback timing value in association with scheduling the PDSCH communication.

In some aspects, an apparatus for wireless communication may include means for determining that a PDSCH communication, to be scheduled by the apparatus, is associated with a plurality of downlink association sets corresponding to a plurality of PDSCH-to-HARQ feedback timing values that each indicate a different slot for reporting HARQ-ACK information for a downlink association set of the plurality of downlink association sets; means for determining a minimum PDSCH-to-HARQ feedback timing value of the plurality of PDSCH-to-HARQ feedback timing values; and means for signaling, to a UE, the minimum PDSCH-to-HARQ feedback timing value in association with scheduling the PDSCH communication.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
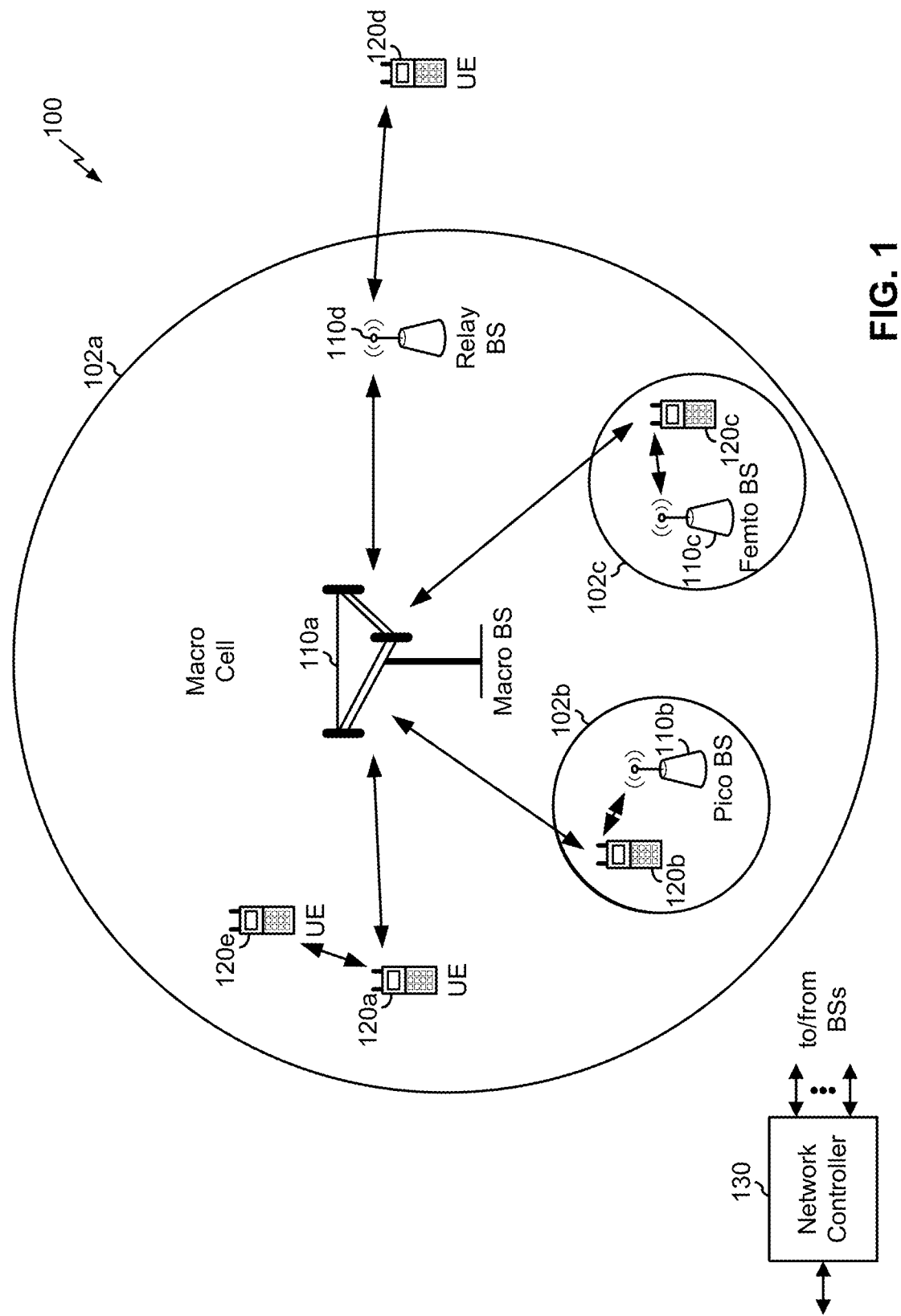
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
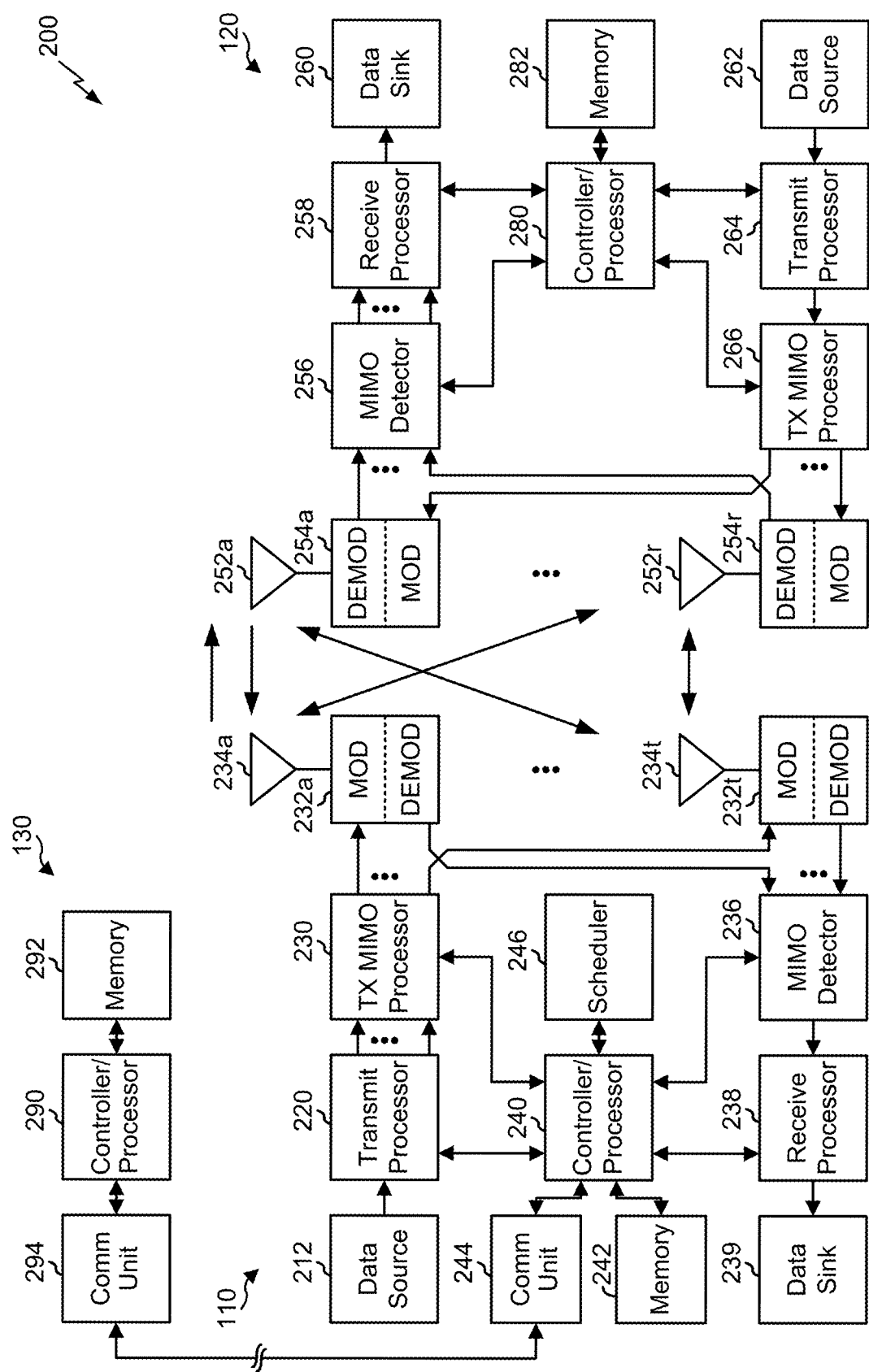
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs.

Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with HARQ-ACK reporting for downlink communications included in multiple downlink association sets, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, process 1000 of FIG. 10, process 1100 and FIG. 11, and/or other processes as described herein. Memories 242 and 282 may store data and program codes for base station 110 and UE 120, respectively. A scheduler 246 may schedule UEs for data transmission on the downlink and/or uplink. In some aspects, one or more components of UE 120 may be included in a housing.

In some aspects, UE 120 may include means for determining that a received physical downlink shared channel (PDSCH) communication is included in multiple downlink association sets, wherein hybrid automatic repeat request acknowledgement (HARQ-ACK) information for different downlink association sets is to be reported in different slots; means for reporting a valid HARQ-ACK in a first slot indicated by a PDSCH-to-HARQ feedback timing value associated with the PDSCH communication; means for selectively reporting the valid HARQ-ACK, corresponding to the PDSCH communication, or a negative acknowledgement (NACK) in a second slot based at least in part on whether the second slot occurs before or after the first slot, wherein the second slot is to be used for reporting HARQ-ACK information associated with a downlink association set of the multiple downlink association sets; and/or the like. Additionally, or alternatively, UE 120 may include means for setting a value in HARQ-ACK information to indicate a valid HARQ-ACK, corresponding to a PDSCH communication, or a NACK based at least in part on a PDSCH-to-HARQ feedback timing value associated with the PDSCH communication; means for transmitting the value in the HARQ-ACK information; and/or the like. In some aspects, such means may include one or more components of UE 120 described in connection with FIG. 2.

In some aspects, base station 110 may include means for receiving a NACK in HARQ-ACK information, wherein the NACK corresponds to a PDSCH communication included in multiple downlink association sets; means for determining a first slot indicated by a PDSCH-to-HARQ feedback timing value associated with the PDSCH communication; means for selectively triggering retransmission of the PDSCH communication based at least in part on a timing of a second slot, in which the HARQ-ACK information is received, relative to the first slot; and/or the like. Additionally, or alternatively, base station 110 may include means for determining that a PDSCH communication, to be scheduled by the base station 110, is associated with a plurality of downlink association sets corresponding to a plurality of PDSCH-to-HARQ feedback timing values that each indicate a different slot for reporting HARQ-ACK information for a downlink association set of the plurality of downlink association sets; means for determining a minimum PDSCH-to-HARQ feedback timing value of the plurality of PDSCH-to-HARQ feedback timing values; means for signaling, to a UE, the minimum PDSCH-to-HARQ feedback timing value in association with scheduling the PDSCH communication; and/or the like. In some aspects, such means may include one or more components of base station 110 described in connection with FIG. 2.

As indicated above, FIG. 2 is provided merely as an example. Other examples may differ from what is described with regard to FIG. 2.

Figure 3:
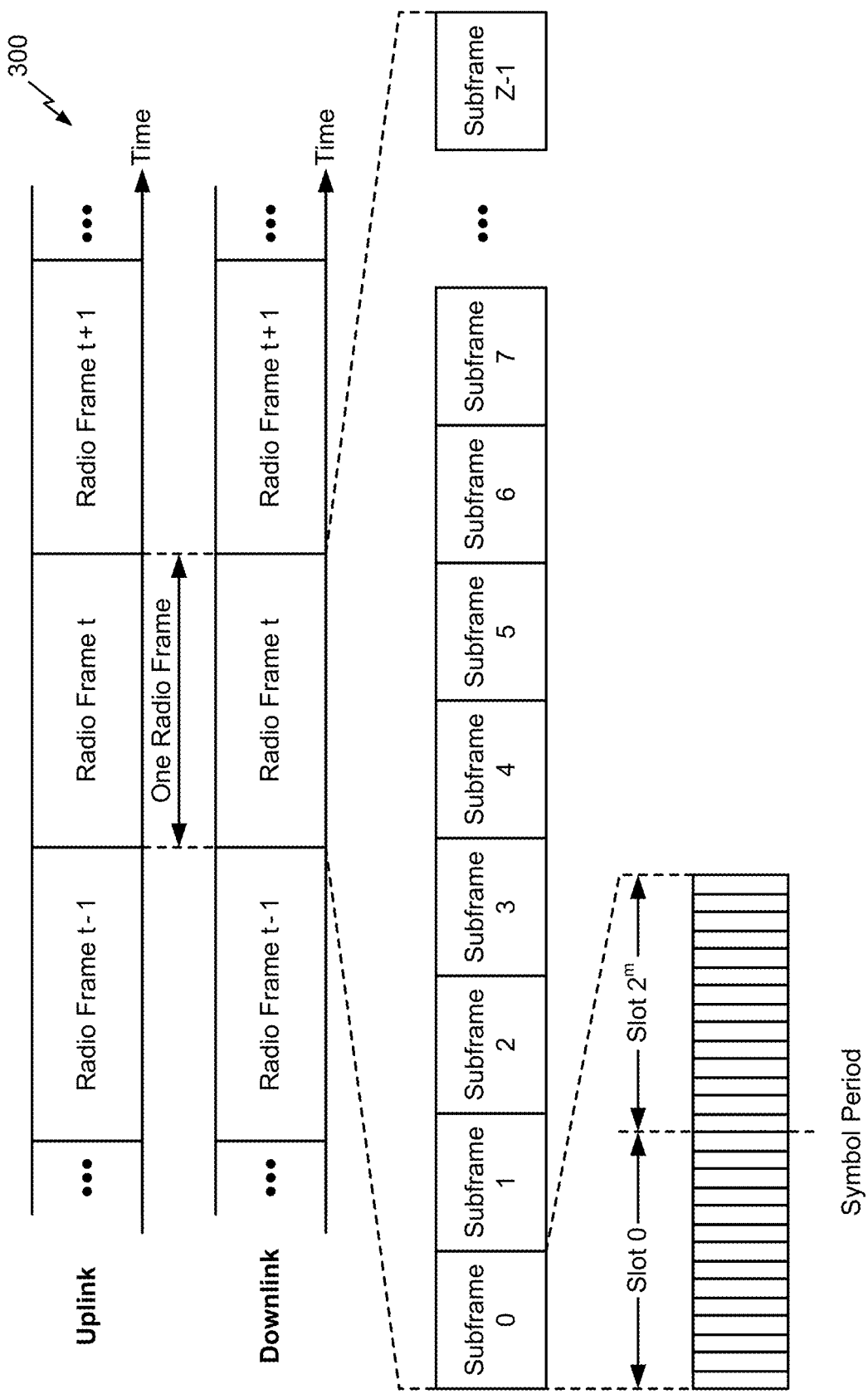
FIG. 3 is a block diagram conceptually illustrating an example of a frame structure in a wireless communication network, in accordance with various aspects of the present disclosure.

FIG. 3 shows an example frame structure 300 for FDD in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3, where m is a numerology used for a transmission, such as 0, 1, 2, 3, 4, and/or the like). Each slot may include a set of L symbol periods. For example, each slot may include fourteen symbol periods (e.g., as shown in FIG. 3), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3 may be used.

As indicated above, FIG. 3 is provided as an example. Other examples may differ from what is described with regard to FIG. 3.

Figure 4:
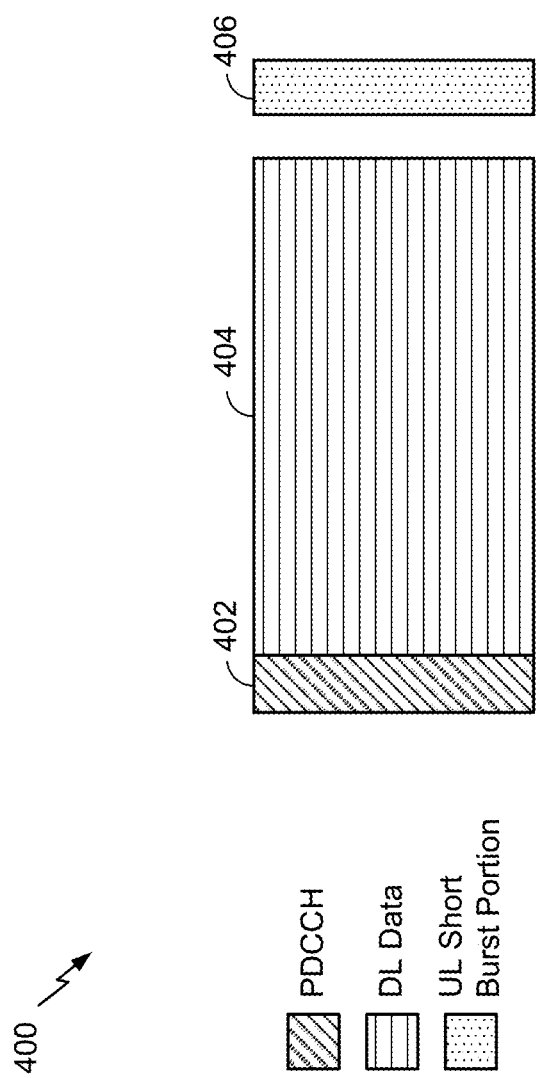
FIG. 4 is a diagram illustrating an example of a downlink (DL)-centric slot, in accordance with various aspects of the present disclosure.

FIG. 4 is a diagram 400 showing an example of a DL-centric slot or wireless communication structure. The DL-centric slot may include a control portion 402. The control portion 402 may exist in the initial or beginning portion of the DL-centric slot. The control portion 402 may include various scheduling information and/or control information corresponding to various portions of the DL-centric slot. In some configurations, the control portion 402 may be a physical DL control channel (PDCCH), as indicated in FIG. 4. In some aspects, the control portion 402 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, and/or the like), and/or the like.

The DL-centric slot may also include a DL data portion 404. The DL data portion 404 may sometimes be referred to as the payload of the DL-centric slot. The DL data portion 404 may include the communication resources utilized to communicate DL data from the scheduling entity (e.g., UE or BS) to the subordinate entity (e.g., UE). In some configurations, the DL data portion 404 may be a physical downlink shared channel (PDSCH).

The DL-centric slot may also include an UL short burst portion 406. The UL short burst portion 406 may sometimes be referred to as an UL burst, an UL burst portion, a common UL burst, a short burst, an UL short burst, a common UL short burst, a common UL short burst portion, and/or various other suitable terms. In some aspects, the UL short burst portion 406 may include one or more reference signals. Additionally, or alternatively, the UL short burst portion 406 may include feedback information corresponding to various other portions of the DL-centric slot. For example, the UL short burst portion 406 may include feedback information corresponding to the control portion 402 and/or the data portion 404. Non-limiting examples of information that may be included in the UL short burst portion 406 include HARQ-ACK feedback (e.g., an ACK or a NACK), an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 406 may include additional or alternative information, such as information pertaining to random access channel (RACH) procedures, scheduling requests, and various other suitable types of information.

In some aspects, a downlink slot may be a DL-centric slot or a DL-only slot. A DL-only slot may exclude the UL short burst portion 406, such that the DL-only slot includes only downlink portions (e.g., DL control portion 402 and DL data portion 404).

As illustrated in FIG. 4, the end of the DL data portion 404 may be separated in time from the beginning of the UL short burst portion 406. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 4 is provided merely as an example. Other examples may differ from what is described with regard to FIG. 4.

Figure 5:
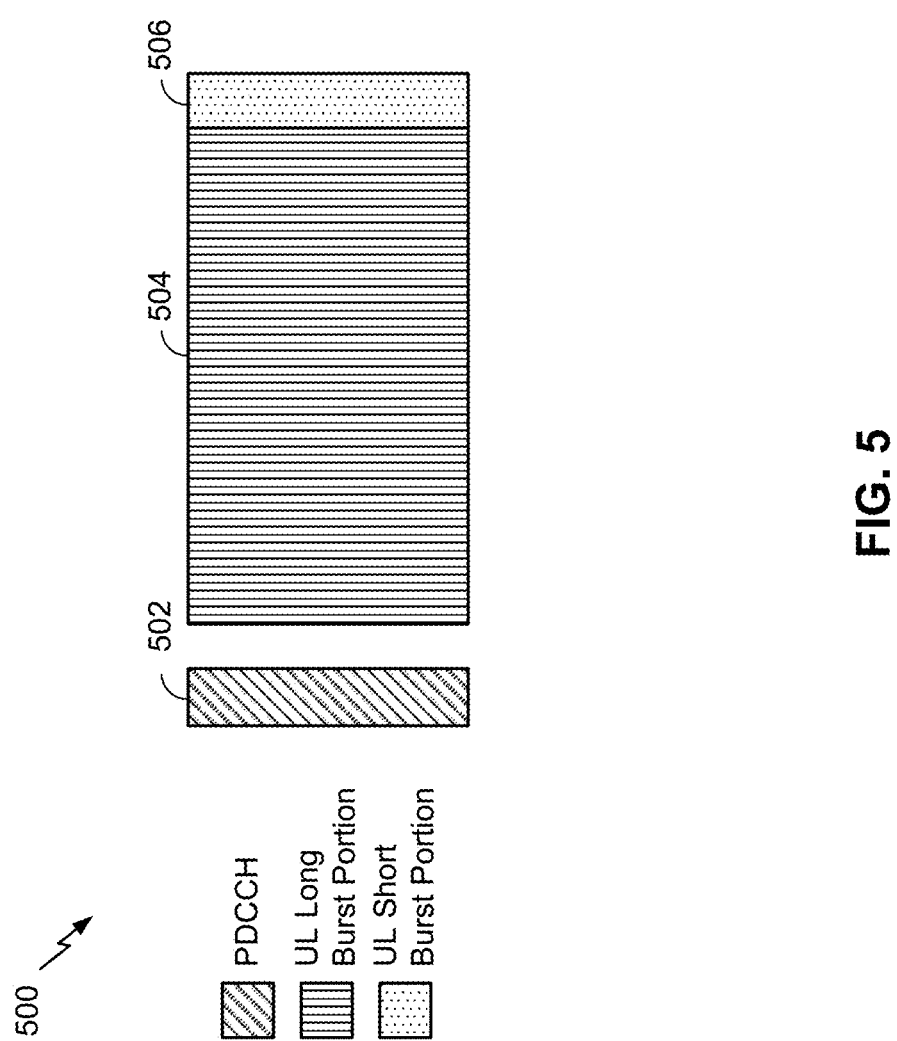
FIG. 5 is a diagram illustrating an example of an uplink (UL)-centric slot, in accordance with various aspects of the present disclosure.

FIG. 5 is a diagram 500 showing an example of an UL-centric slot or wireless communication structure. The UL-centric slot may include a control portion 502. The control portion 502 may exist in the initial or beginning portion of the UL-centric slot. The control portion 502 in FIG. 5 may be similar to the control portion 402 described above with reference to FIG. 4. The UL-centric slot may also include an UL long burst portion 504. The UL long burst portion 504 may sometimes be referred to as the payload of the UL-centric slot. The UL portion may refer to the communication resources utilized to communicate UL data from the subordinate entity (e.g., UE) to the scheduling entity (e.g., UE or BS). In some configurations, the control portion 502 may be a physical DL control channel (PDCCH).

As illustrated in FIG. 5, the end of the control portion 502 may be separated in time from the beginning of the UL long burst portion 504. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot may also include an UL short burst portion 506. The UL short burst portion 506 in FIG. 5 may be similar to the UL short burst portion 406 described above with reference to FIG. 4, and may include any of the information described above in connection with FIG. 4. The foregoing is merely one example of an UL-centric wireless communication structure, and alternative structures having similar features may exist without necessarily deviating from the aspects described herein.

In some aspects, an uplink slot may be an UL-centric slot or an UL-only slot. An UL-only slot may exclude the DL control portion 502, such that the UL-only slot includes only uplink portions (e.g., UL long burst portion 504 and UL short burst portion 506).

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some aspects, the sidelink signals may be communicated using a licensed spectrum (unlike wireless local area networks, which typically use an unlicensed spectrum).

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

As indicated above, FIG. 5 is provided merely as an example. Other examples may differ from what is described with regard to FIG. 5.

Figure 6:
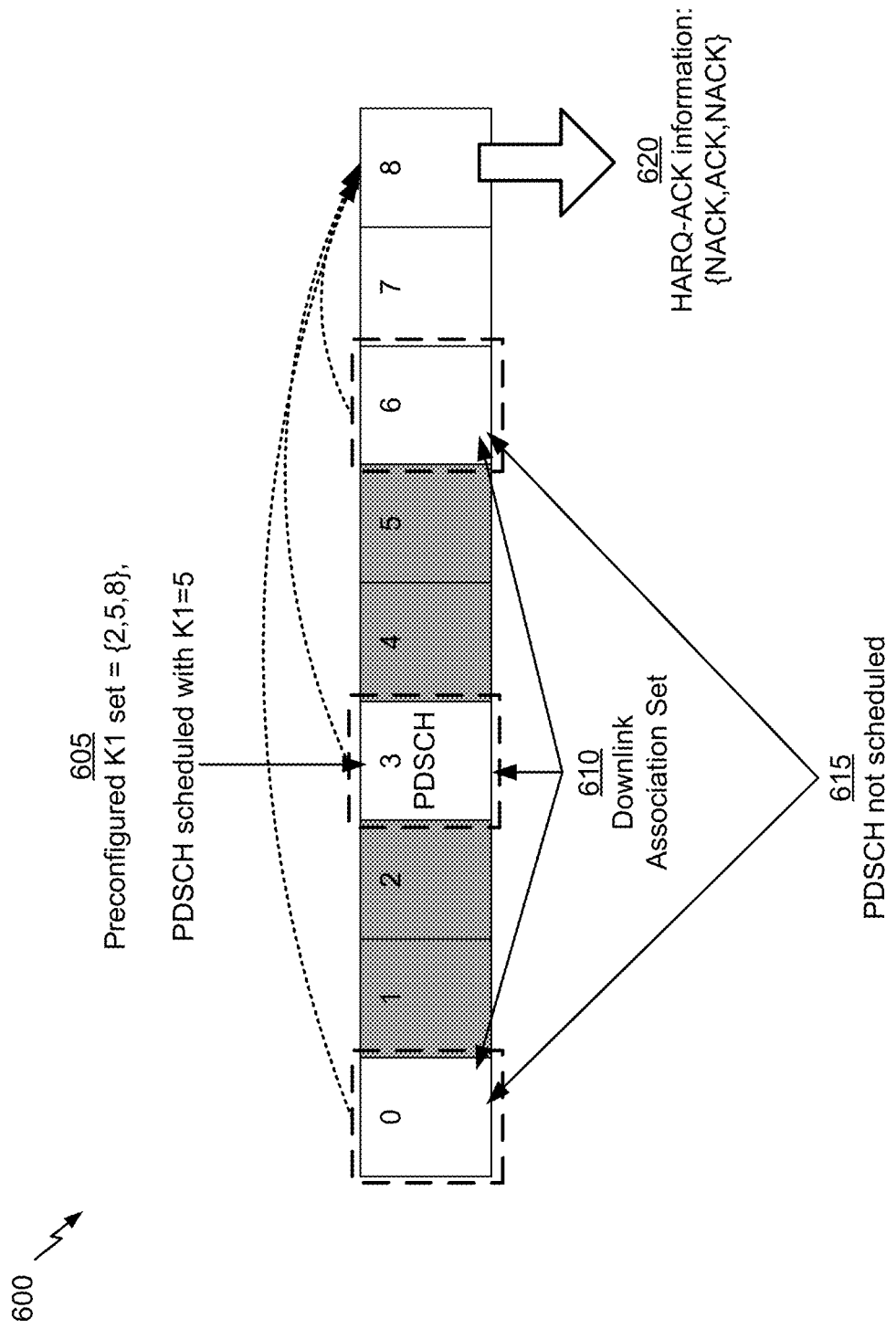
FIG. 6 is a diagram illustrating an example of HARQ-ACK reporting for a downlink communication included in a single downlink association set, in accordance with various aspects of the present disclosure.

FIG. 6 is a diagram illustrating an example 600 of HARQ-ACK reporting for a downlink communication included in a single downlink association set, in accordance with various aspects of the present disclosure.

As shown in FIG. 6, a UE 120 may receive a physical downlink shared channel (PDSCH) communication that is associated with a single downlink association set. A downlink association set may refer to a set of downlink slots (e.g., downlink-centric slots, downlink-only slots, and/or the like) for which a corresponding acknowledgement (ACK) or negative acknowledgement (NACK) are to be reported in a same slot in the same hybrid automatic repeat request acknowledgement (HARQ-ACK) information that is generated according to the same HARQ-ACK codebook.

In some aspects, a downlink association set may be determined based at least in part on a preconfigured set of PDSCH-to-HARQ feedback timing values, which may also be referred to as K1 values in the 3GPP standard. A PDSCH-to-HARQ feedback timing value may indicate a timing (e.g., a number of slots) between a last slot of a PDSCH communication, to which the PDSCH-to-HARQ feedback timing value corresponds, and a slot in which HARQ-ACK feedback, corresponding to the PDSCH communication, is to be transmitted. Thus, the PDSCH-to-HARQ timing value may indicate a slot in which HARQ-ACK feedback, corresponding to the PDSCH communication, is to be transmitted. In some aspects, a UE 120 may receive a PDSCH-to-HARQ timing value in downlink control information (DCI) that schedules the PDSCH communication. A PDSCH-to-HARQ feedback timing value may be referred to herein as a PDSCH-to-HARQ timing value or a K1 value for brevity.

In some aspects, a set of K1 values may be preconfigured (e.g., for a UE 120, for a cell, and/or the like). In this case, the preconfigured set of K1 values may be indicated in a radio resource control (RRC) message, a system information block (SIB), and/or the like. For example, a set of preconfigured K1 values may be indicated in an RRC message, and a particular K1 value may be selected from the set by a base station 110 when scheduling a PDSCH communication. The selected K1 value may be indicated by the base station 110 to the UE 120 in DCI, such as a downlink grant that schedules the PDSCH communication to which the selected K1 value corresponds.

As indicated above, a UE 120 may determine a downlink association set for a PDSCH communication based at least in part on a preconfigured set of K1 values indicated to a UE 120. For example, the UE 120 may identify a HARQ-ACK reporting occasion, such as a slot in which HARQ-ACK feedback is to be transmitted on a physical uplink control channel (PUCCH) or as uplink control information (UCI) piggybacked on a physical uplink shared channel (PUSCH). The UE 120 may then identify each slot that occurs K1 slots before the HARQ-ACK reporting occasion, for each K1 value in a preconfigured set of K1 values. If an identified slot is an uplink slot, then the uplink slot may be removed from the set of slots to form the downlink association set. Thus, the downlink association set for a HARQ-ACK reporting occasion includes only downlink slots for which a K1 value, of the preconfigured set of K1 values, points to a slot that includes the HARQ-ACK reporting occasion.

In the HARQ-ACK reporting occasion, the UE 120 may report HARQ-ACK information, generated according to a HARQ-ACK codebook, which may be used to indicate an ACK or a NACK for slots included in the downlink association set corresponding to the HARQ-ACK reporting occasion. In some aspects, the HARQ-ACK codebook may be semi-statically configured (e.g., a semi-static HARQ-ACK codebook, a Type 1 HARQ-ACK codebook, and/or the like). In this case, a size (e.g., a number of bits) of the HARQ-ACK codebook may be determined solely by a set of semi-static configurations (e.g., which may be indicated in an RRC message, system information, and/or the like). For example, the size of a semi-statically configured HARQ-ACK codebook may be determined based at least in part on a number of K1 values included in the preconfigured set of K1 values, a number of component carriers in a PUCCH group, an UL-DL TDD configuration, a supported number of nonoverlapped PDSCH per slot, a UE capability regarding a number of PDSCH that can be supported per slot, a number of code block groups (CBGs) per component carrier, and/or the like. In some aspects, a size of the HARQ-ACK codebook may be determined based at least in part on the number of slots included in the downlink association set corresponding to the HARQ-ACK codebook.

As an example, and as shown in FIG. 6, a UE 120 may receive a PDSCH communication (e.g., in a slot shown as slot 3). As shown by reference number 605, the preconfigured set of K1 values for the UE 120 may include three K1 values, shown as 2, 5, and 8. In example 600, the PDSCH communication is scheduled with a K1 value of 5. Thus, HARQ-ACK information, that includes HARQ-ACK feedback for the PDSCH communication, is to be transmitted in slot 8, which occurs 5 slots after slot 3 in which the PDSCH communication is received.

As shown by reference number 610, in example 600, the downlink association set for the HARQ-ACK information to be transmitted in slot 8 includes slots 0, 3, and 6. This may be determined using the preconfigured set of K1 values, since slot 6 occurs 2 slots before slot 8, slot 3 occurs 5 slots before slot 8, and slot 0 occurs 8 slots before slot 8. In this case, slots 0, 3, and 6 are downlink slots, and thus are included in the downlink association set. If a slot 0, 3, or 6 were an uplink slot, then that slot would not be included in the downlink association set.

As shown by reference number 615, in example 600, assume that a PDSCH communication is not scheduled, received, and/or successfully decoded in slots 0 and 6, while a PDSCH communication is received and successfully decoded in slot 3. As a result, and as shown by reference number 620, the UE 120 reports HARQ-ACK information, for this downlink association set, of NACK (e.g., corresponding to slot 0, in which a PDSCH communication is not scheduled, received, or successfully decoded), ACK (e.g., corresponding to slot 3, in which a PDSCH communication is successfully received and decoded), and NACK (e.g., corresponding to slot 6, in which a PDSCH communication is not scheduled, received, or successfully decoded).

In FIG. 6, the PDSCH communication received in slot 3 belongs to a single downlink association set (e.g., for the HARQ-ACK information transmitted in slot 8). However, as will be described in more detail below in connection with FIG. 7, in some aspects, a PDSCH communication may belong to multiple downlink association sets. In this case, the UE 120 may need to determine how to handle HARQ-ACK reporting across multiple HARQ-ACK information transmissions corresponding to the multiple downlink association sets. Furthermore, a base station 110 may need to determine how to interpret HARQ-ACK information for the different downlink association sets. Additional details are described below.

As indicated above, FIG. 6 is provided as an example. Other examples may differ from what is described with respect to FIG. 6.

Figure 7:
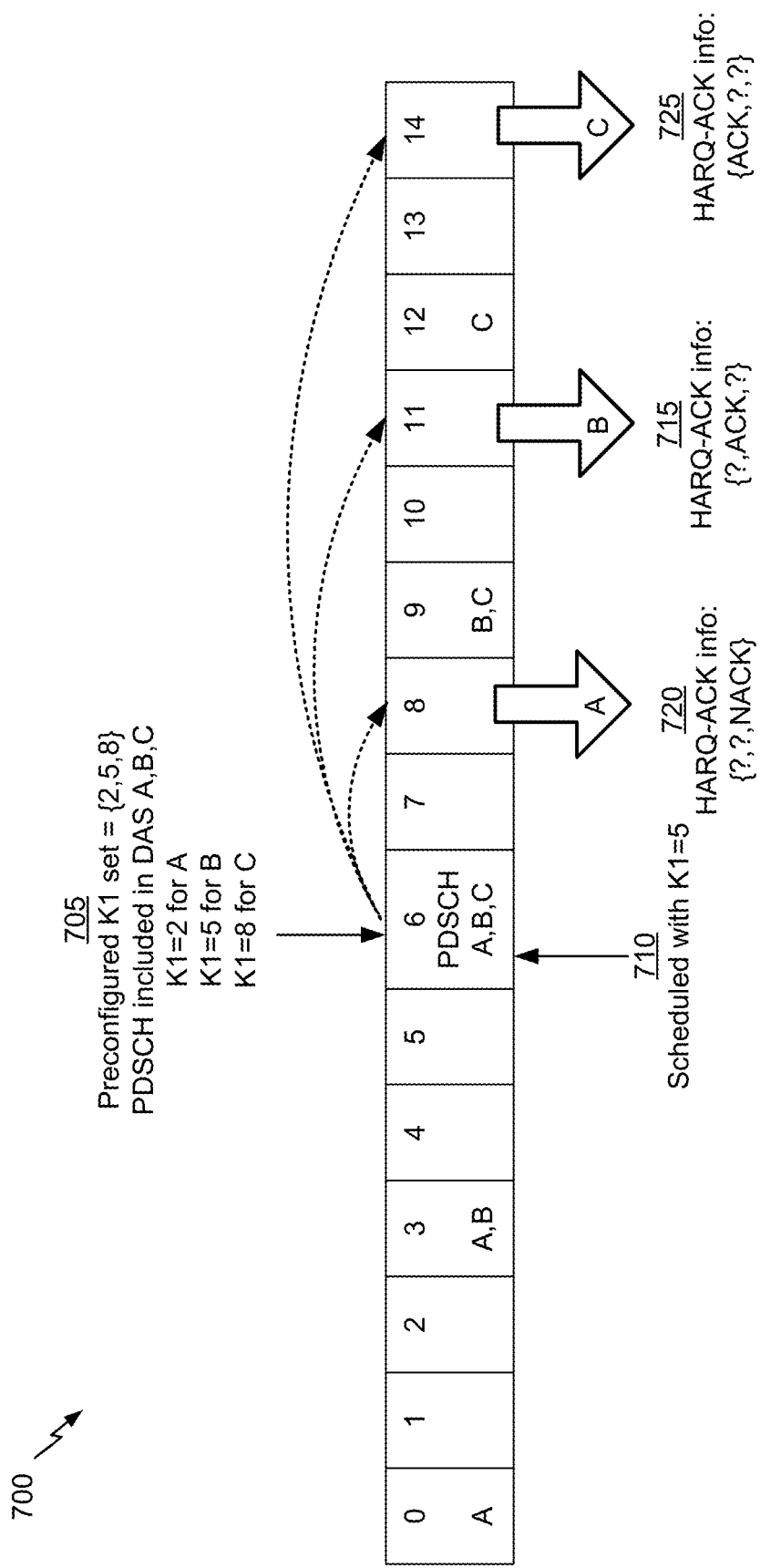
FIG. 7 is a diagram illustrating an example of HARQ-ACK reporting for downlink communications included in multiple downlink association sets, in accordance with various aspects of the present disclosure.

FIG. 7 is a diagram illustrating an example 700 of HARQ-ACK reporting for downlink communications included in multiple downlink association sets, in accordance with various aspects of the present disclosure.

As shown in FIG. 7, in some aspects, a PDSCH communication may be included in multiple downlink association sets, where HARQ-ACK information for different downlink association sets is to be reported in different slots. For example, as shown by reference number 705, a UE 120 may receive an indication (e.g., in an RRC message) of a preconfigured set of K1 values, shown as 2, 5, and 8. Using this set of K1 values and a set of determined HARQ-ACK reporting occasions, the UE 120 may determine that a PDSCH communication received in slot 6 is included in three downlink association sets. As described above in connection with FIG. 6, a HARQ-ACK codebook, for the HARQ-ACK information, may be semi-statically configured.

The first downlink association set (shown as "DAS A" or simply "A") includes slots 0, 3, and 6, and the HARQ-ACK information for the first downlink association set is reported in slot 8 (e.g., based at least in part on a K1 value of one or more PDSCH communications pointing to slot 8). The second downlink association set (shown as "DAS B" or simply "B") includes slots 3, 6, and 9, and the HARQ-ACK information for the second downlink association set is reported in slot 11. The third downlink association set (shown as "DAS C" or simply "C") includes slots 6, 9, and 12, and the HARQ-ACK information for the first downlink association set is reported in slot 14. This number of downlink association sets (e.g., three) is provided as an example, and a PDSCH communication may belong to a different number of multiple downlink association sets (e.g., two sets, four sets, five sets, and/or the like) depending on a number of preconfigured K1 values, an UL/DL slot configuration, and/or the like.

When a PDSCH communication is included in multiple downlink association sets, the UE 120 may need to determine how to handle HARQ-ACK reporting for multiple HARQ-ACK information transmissions corresponding to the multiple downlink association sets. For example, the UE 120 may need to determine, for each HARQ-ACK information transmission, whether to report a valid HARQ-ACK (e.g., valid HARQ-ACK feedback) or a NACK. As used herein, a valid HARQ-ACK (sometimes referred to as a HARQ-ACK) is determined based at least in part on a result of decoding the PDSCH communication. The valid HARQ-ACK may be an ACK if the PDSCH communication is successfully decoded, or may be a NACK if the PDSCH communication is not successfully decoded.

In some aspects, the UE 120 may report a valid HARQ-ACK for the PDSCH communication only in HARQ-ACK information indicated by the K1 value for the PDSCH communication, and may report a NACK in the other HARQ-ACK information transmissions corresponding to the PDSCH communication. However, this may waste resources if the HARQ-ACK information indicated by the K1 value is not successfully decoded by a base station 110 since the base station 110 will not be able to use another HARQ-ACK information transmission to read a valid HARQ-ACK for the PDSCH communication. This may result in a larger number of retransmissions of PDSCH communications (thereby wasting network resources, UE resources, and base station resources) as compared to repeating the valid HARQ-ACK in multiple HARQ-ACK information transmissions.

In some aspects, the UE 120 may report a valid HARQ-ACK for the PDSCH communication in all HARQ-ACK information corresponding to the PDSCH communication (e.g., all HARQ-ACK information transmissions for all downlink association sets that include the PDSCH communication). However, this may reduce a HARQ-ACK processing timeline for the UE 120 if there is a HARQ-ACK reporting occasion that occurs before the HARQ-ACK reporting occasion indicated by the K1 value. As a result, the UE 120 may consume additional resources (e.g., processing power, battery power, and/or the like) to comply with the shorter HARQ-ACK processing timeline, and/or may be constrained by delaying other types of processing until after the HARQ-ACK feedback is processed.

Some techniques and apparatuses described herein conserve UE resources and reduce UE processing constraints for HARQ-ACK feedback, while also reducing a number of PDSCH retransmissions by repeating HARQ-ACK feedback without consuming additional UE resources. Additional details are described below.

As shown by reference number 710, the PDSCH communication in slot 6 may be associated with a K1 value (e.g., a PDSCH-to-HARQ feedback timing value) of 5. For example, a downlink grant that schedules the PDSCH communication may indicate the K1 value of 5 for the PDSCH communication.

As shown by reference number 715, the HARQ-ACK information corresponding to the K1 value of 5 may be transmitted in a first slot, shown as slot 11 (e.g., which occurs K1=5 slots after slot 6, in which the PDSCH communication is received). Because the PDSCH communication is scheduled with K1=5, the UE 120 may report a valid HARQ-ACK in the HARQ-ACK information transmitted in slot 11. In example 700, the valid HARQ-ACK is an ACK because the PDSCH communication in slot 6 is successfully decoded by the UE 120. As shown, the ACK is reported as a second value in the HARQ-ACK information (e.g., which includes 3 values) because the slot in which the PDSCH communication is received (e.g., slot 6) occurs second in time among the slots included in the downlink association set corresponding to the HARQ-ACK information transmitted in slot 11. In this case, the UE 120 reports a first value for slot 3, a second value for slot 6, and a third value for slot 9 in the HARQ-ACK information. In FIG. 7, a question mark represents a value, in HARQ-ACK information, corresponding to a different slot than slot 6.

For the other HARQ-ACK information transmissions associated with the PDSCH communication (e.g., the HARQ-ACK information transmissions not associated with the K1 value), the UE 120 may determine whether to report a valid HARQ-ACK (e.g., an ACK or a NACK depending on a result of decoding the PDSCH communication) or a NACK (e.g., that does not depend on a result of decoding the PDSCH communication). In some aspects, the UE 120 may determine whether to report the valid HARQ-ACK or the NACK in HARQ-ACK information based at least in part on whether a slot (e.g., a second slot), in which the HARQ-ACK information is to be transmitted, occurs before or after a first slot indicated by the K1 value.

For example, as shown by reference number 720, if the HARQ-ACK information is to be transmitted in a second slot (e.g., slot 8) that occurs before a first slot (e.g., slot 11) indicated by the K1 value, then the UE 120 may report a NACK for a value corresponding to the PDSCH communication. This NACK may not depend on a result of decoding the PDSCH communication, and this NACK may be reported regardless of whether the PDSCH communication is successfully decoded (e.g., regardless of whether decoding the PDSCH communication result in an ACK or a NACK). In some aspects, the NACK may be reported before HARQ-ACK processing of the PDSCH communication is complete (e.g., where a result of decoding is unknown when the HARQ-ACK information is transmitted). In this way, the UE 120 need not expend additional processing resources or constrain other processing by reducing a HARQ-ACK reporting timeline (e.g., from K1=5 to K1=2).

As further shown by reference number 720, the NACK is reported as a third value in the HARQ-ACK information (e.g., which includes 3 values) because the slot in which the PDSCH communication is received (e.g., slot 6) occurs third in time among the slots included in the downlink association set corresponding to the HARQ-ACK information transmitted in slot 8. In this case, the UE 120 reports a first value for slot 0, a second value for slot 3, and a third value for slot 6 in the HARQ-ACK information.

As another example, as shown by reference number 725, if the HARQ-ACK information is to be transmitted in a second slot (e.g., slot 14) that occurs after a first slot (e.g., slot 11) indicated by the K1 value, then the UE 120 may report a valid HARQ-ACK for a value corresponding to the PDSCH communication. This HARQ-ACK may depend on a result of decoding the PDSCH communication, and may be reported as an ACK if the PDSCH communication is successfully decoded or a NACK if the PDSCH communication is not successfully decoded. In this way, the UE 120 may repeat the valid HARQ-ACK, transmitted in a slot indicated by the K1 value, in one or more HARQ-ACK reporting occasions (e.g., if any exist) that occur after the slot indicated by the K1 value. This may not consume any additional processing resources because the UE 120 must report a value in these one or more HARQ-ACK reporting occasions, and may permit a base station 110 to receive the valid HARQ-ACK even if the HARQ-ACK information in the slot indicated by the K1 value is not successfully decoded by the base station 110.

As further shown by reference number 725, the valid HARQ-ACK (shown as an ACK in example 700) is reported as a first value in the HARQ-ACK information (e.g., which includes 3 values) because the slot in which the PDSCH communication is received (e.g., slot 6) occurs first in time among the slots included in the downlink association set corresponding to the HARQ-ACK information transmitted in slot 14. In this case, the UE 120 reports a first value for slot 6, a second value for slot 9, and a third value for slot 12 in the HARQ-ACK information.

Thus, for particular HARQ-ACK information, the UE 120 may set a value, corresponding to a slot in which the PDSCH communication is received, to indicate a valid HARQ-ACK for the PDSCH communication (e.g., an ACK or a NACK depending on a result of decoding the PDSCH communication) or a NACK (e.g., that does not depend on a result of decoding the PDSCH communication) based at least in part on the K1 value associated with the PDSCH communication. For example, the UE 120 may set the value to indicate the valid HARQ-ACK if the HARQ-ACK information is to be transmitted in a slot indicated by the K1 value or a later slot (e.g., that occurs after the slot indicated by the K1 value). Conversely, the UE 120 may set the value to indicate the NACK if the HARQ-ACK information is to be transmitted in a slot that is earlier than a slot indicated by the K1 value (e.g., a slot that occurs before the slot indicated by the K1 value).

When a base station 110 receives HARQ-ACK information that includes a value for a slot and/or a PDSCH communication included in multiple downlink association sets, the base station 110 may need to determine how to interpret the value. If the HARQ-ACK information is received in a slot indicated by the K1 value for the PDSCH communication, or a slot that occurs after the slot indicated by the K1 value, then the base station 110 may interpret the value as a valid HARQ-ACK, and may perform further processing using the valid HARQ-ACK. Conversely, if the HARQ-ACK information is received in a slot before the slot indicated by the K1 value, then the base station 110 may not interpret the value as a valid HARQ-ACK, and may discard the value, thereby conserving processing resources of the base station 110.

For example, the base station 110 may receive a NACK in HARQ-ACK information, and the NACK may correspond to a PDSCH communication (or a slot of the PDSCH communication) that is included in multiple downlink association sets. The base station 110 may determine a first slot indicated by a K1 value associated with the PDSCH communication. The base station 110 may selectively trigger retransmission (e.g., due to the NACK) based at least in part on a timing of a second slot, in which the HARQ-ACK information is received, relative to the first slot. For example, if the second slot is the same slot as the first slot, or if the second slot occurs after the first slot, then the NACK may be valid HARQ-ACK feedback for the PDSCH communication, and the base station 110 may trigger retransmission of the PDSCH communication. However, if the second slot occurs before the first slot, then the NACK may not depend on a result of decoding the PDSCH communication (e.g., may not be valid HARQ-ACK feedback), and the base station 110 may not trigger retransmission of the PDSCH communication (e.g., unless later received valid HARQ-ACK feedback indicates a NACK for the PDSCH communication). In this way, network resources may be conserved by triggering retransmissions only in response to valid HARQ-ACK feedback.

In some aspects, the base station 110 may always select and indicate a minimum permissible K1 value (e.g., that corresponds to a valid HARQ-ACK reporting occasion) for a PDSCH communication. For example, the base station 110 may determine that a PDSCH communication, to be scheduled by the base station 110, is associated with multiple downlink association sets corresponding to multiple K1 values. The base station 110 may determine a minimum K1 value from the multiple K1 values, and may signal the minimum K1 value to the UE 120 in association with scheduling the PDSCH communication. In some aspects, the base station 110 may prevent a K1 value other than the minimum K1 value from being signaled to the UE 120. In this case, the UE 120 may always repeat valid HARQ-ACK, corresponding to the PDSCH communication, in all HARQ-ACK information transmissions, and may conserve UE resources that would otherwise be used to determine whether to transmit a valid HARQ-ACK or a NACK for different HARQ-ACK information transmissions.

As indicated above, FIG. 7 is provided as an example. Other examples may differ from what is described with respect to FIG. 7.

Figure 8:
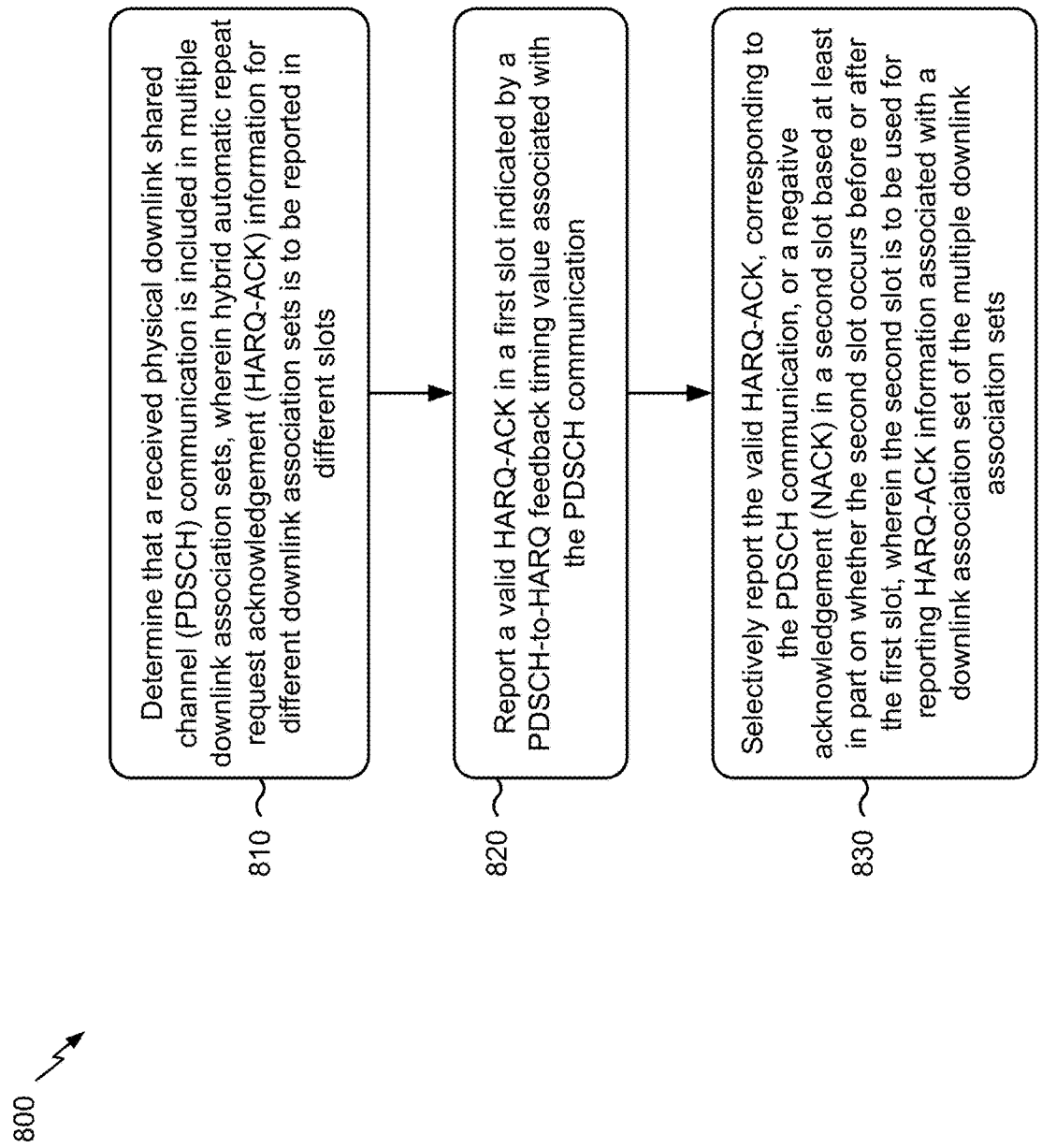
FIGS. 8-11 are diagrams illustrating example processes associated with HARQ-ACK reporting for downlink communications included in multiple downlink association sets, in accordance with various aspects of the present disclosure.

FIG. 8 is a diagram illustrating an example process 800 performed, for example, by a UE, in accordance with various aspects of the present disclosure. Example process 800 is an example where a UE (e.g., UE 120 and/or the like) performs operations associated with HARQ-ACK reporting for downlink communications included in multiple downlink association sets.

As shown in FIG. 8, in some aspects, process 800 may include determining that a received PDSCH communication is included in multiple downlink association sets, wherein HARQ-ACK information for different downlink association sets is to be reported in different slots (block 810). For example, the UE (e.g., using controller/processor 280 and/or the like) may determine that a received PDSCH communication is included in multiple downlink association sets, as described above in connection with FIG. 7. In some aspects, HARQ-ACK information for different downlink association sets is to be reported in different slots.

As further shown in FIG. 8, in some aspects, process 800 may include reporting a valid HARQ-ACK in a first slot indicated by a PDSCH-to-HARQ feedback timing value associated with the PDSCH communication (block 820). For example, the UE (e.g., using controller/processor 280, transmit processor 264, TX MIMO processor 266, MOD 254, antenna 252, and/or the like) may report a valid HARQ-ACK in a first slot indicated by a PDSCH-to-HARQ feedback timing value associated with the PDSCH communication, as described above in connection with FIG. 7.

As further shown in FIG. 8, in some aspects, process 800 may include selectively reporting the valid HARQ-ACK, corresponding to the PDSCH communication, or a NACK in a second slot based at least in part on whether the second slot occurs before or after the first slot, wherein the second slot is to be used for reporting HARQ-ACK information associated with a downlink association set of the multiple downlink association sets (block 830). For example, the UE (e.g., using controller/processor 280, transmit processor 264, TX MIMO processor 266, MOD 254, antenna 252, and/or the like) may selectively report the valid HARQ-ACK, corresponding to the PDSCH communication, or a NACK in a second slot based at least in part on whether the second slot occurs before or after the first slot, as described above in connection with FIG. 7. In some aspects, the second slot is to be used for reporting HARQ-ACK information associated with a downlink association set of the multiple downlink association sets.

Process 800 may include additional aspects, such as any single aspect or any combination of aspects described below and/or in connection with one or more other processes described elsewhere herein.

In a first aspect, the valid HARQ-ACK is reported in the second slot based at least in part on a determination that the second slot occurs after the first slot.

In a second aspect, alone or in combination with the first aspect, the valid HARQ-ACK is an ACK when the PDSCH communication is successfully decoded.

In a third aspect, alone or in combination with one or more of the first and second aspects, the valid HARQ-ACK is a NACK when the PDSCH communication is not successfully decoded.

In a fourth aspect, alone or in combination with one or more of the first through third aspects, the NACK is reported in the second slot based at least in part on a determination that the second slot occurs before the first slot.

In a fifth aspect, alone or in combination with one or more of the first through fourth aspects, the HARQ-ACK information is generated according to a HARQ-ACK codebook that is semi-statically configured.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
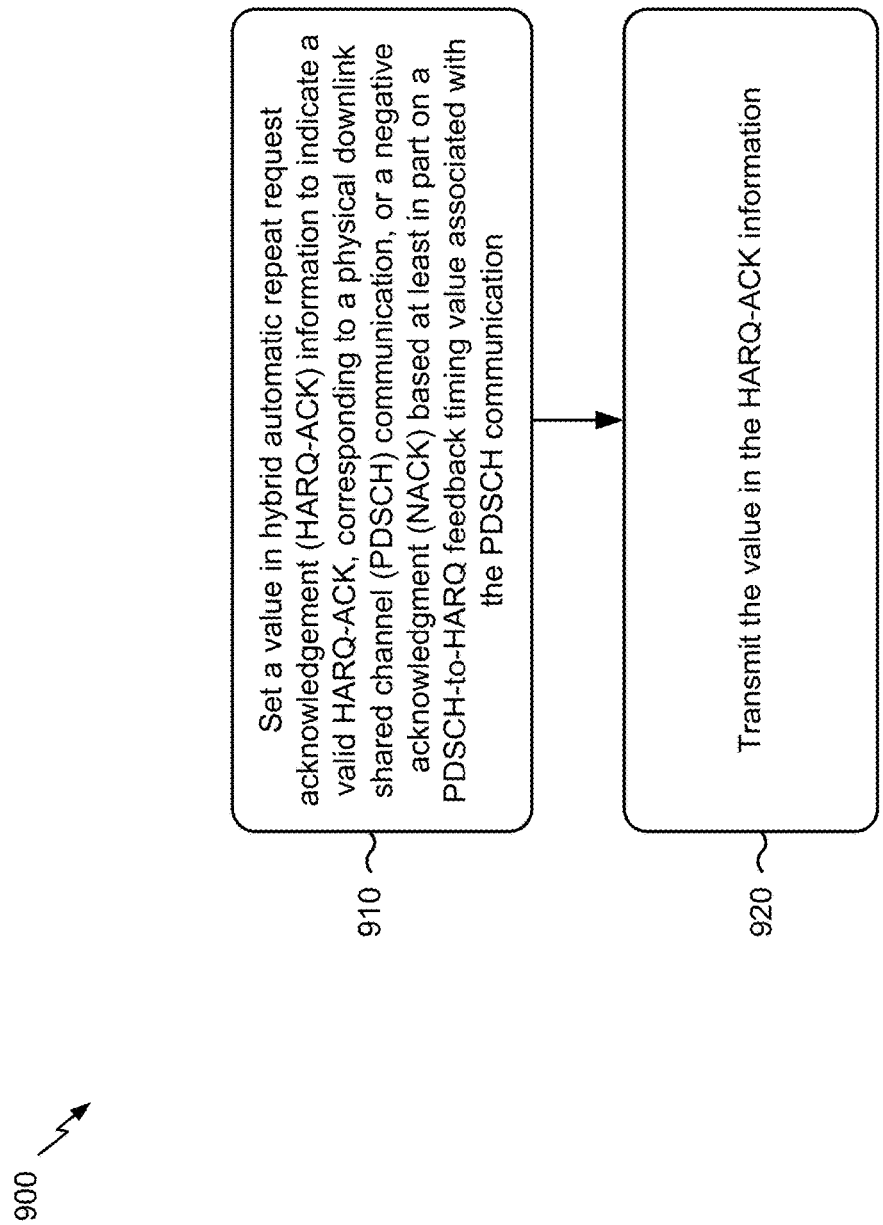

FIG. 9 is a diagram illustrating an example process 900 performed, for example, by a UE, in accordance with various aspects of the present disclosure. Example process 900 is an example where a UE (e.g., UE 120 and/or the like) performs operations associated with HARQ-ACK reporting for downlink communications included in multiple downlink association sets.

As shown in FIG. 9, in some aspects, process 900 may include setting a value in HARQ-ACK information to indicate a valid HARQ-ACK, corresponding to a PDSCH communication, or a NACK based at least in part on a PDSCH-to-HARQ feedback timing value associated with the PDSCH communication (block 910). For example, the UE (e.g., using controller/processor 280 and/or the like) may set a value in HARQ-ACK information to indicate a valid HARQ-ACK, corresponding to a PDSCH communication, or a NACK based at least in part on a PDSCH-to-HARQ feedback timing value associated with the PDSCH communication, as described above in connection with FIG. 7.

As further shown in FIG. 9, in some aspects, process 900 may include transmitting the value in the HARQ-ACK information (block 920). For example, the UE (e.g., using controller/processor 280, transmit processor 264, TX MIMO processor 266, MOD 254, antenna 252, and/or the like) may transmit the value in the HARQ-ACK information, as described above in connection with FIG. 7.

Process 900 may include additional aspects, such as any single aspect or any combination of aspects described below and/or in connection with one or more other processes described elsewhere herein.

In a first aspect, the PDSCH communication is included in multiple downlink association sets.

In a second aspect, alone or in combination with the first aspect, HARQ-ACK information for different downlink association sets is to be reported in different slots.

In a third aspect, alone or in combination with one or more of the first and second aspects, the value is set to indicate the valid HARQ-ACK if the HARQ-ACK information is to be transmitted in a slot indicated by the PDSCH-to-HARQ feedback timing value or a later slot.

In a fourth aspect, alone or in combination with one or more of the first through third aspects, the valid HARQ-ACK is an ACK when the PDSCH communication is successfully decoded.

In a fifth aspect, alone or in combination with one or more of the first through fourth aspects, the valid HARQ-ACK is a NACK when the PDSCH communication is not successfully decoded.

In a sixth aspect, alone or in combination with one or more of the first through fifth aspects, the value is set to indicate the NACK if the HARQ-ACK information is to be transmitted in a slot that is earlier than a slot indicated by the PDSCH-to-HARQ feedback timing value.

In a seventh aspect, alone or in combination with one or more of the first through sixth aspects, the HARQ-ACK information is transmitted according to a HARQ-ACK codebook that is semi-statically configured.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
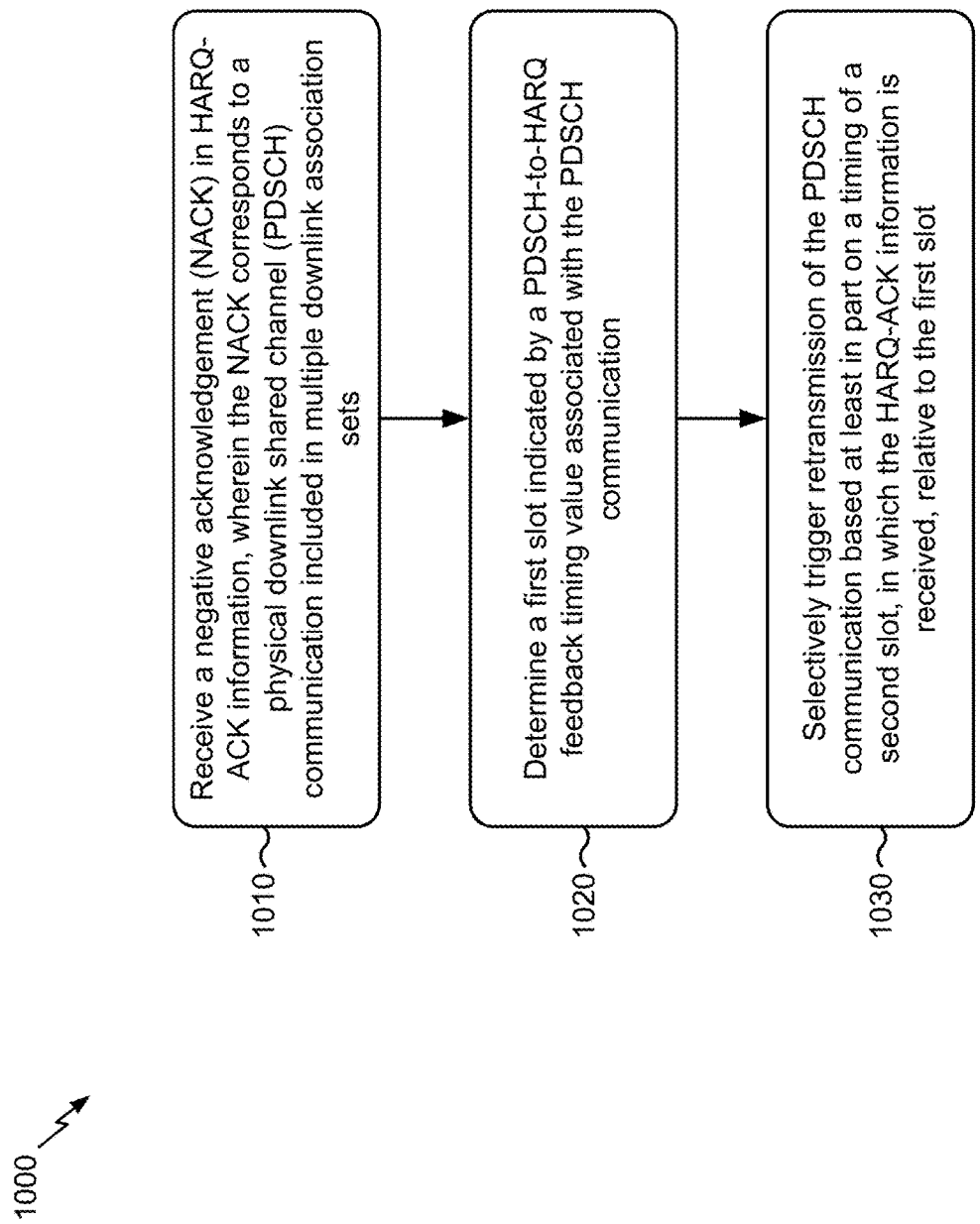

FIG. 10 is a diagram illustrating an example process 1000 performed, for example, by a base station, in accordance with various aspects of the present disclosure. Example process 1000 is an example where a base station (e.g., base station 110 and/or the like) performs operations associated with HARQ-ACK reporting for downlink communications included in multiple downlink association sets.

As shown in FIG. 10, in some aspects, process 1000 may include receiving a NACK in HARQ-ACK information, wherein the NACK corresponds to a PDSCH communication included in multiple downlink association sets (block 1010). For example, the base station (e.g., using antenna 234, DEMOD 232, MIMO detector 236, receive processor 238, controller/processor 240, and/or the like) may receive a NACK in HARQ-ACK information, as described above in connection with FIG. 7. In some aspects, the NACK corresponds to a PDSCH communication included in multiple downlink association sets.

As further shown in FIG. 10, in some aspects, process 1000 may include determining a first slot indicated by a PDSCH-to-HARQ feedback timing value associated with the PDSCH communication (block 1020). For example, the base station (e.g., using controller/processor 240 and/or the like) may determine a first slot indicated by a PDSCH-to-HARQ feedback timing value associated with the PDSCH communication, as described above in connection with FIG. 7.

As further shown in FIG. 10, in some aspects, process 1000 may include selectively triggering retransmission of the PDSCH communication based at least in part on a timing of a second slot, in which the HARQ-ACK information is received, relative to the first slot (block 1030). For example, the base station (e.g., using controller/processor 240, transmit processor 220, TX MIMO processor 230, MOD 232, antenna 234, and/or the like) may selectively trigger retransmission of the PDSCH communication based at least in part on a timing of a second slot, in which the HARQ-ACK information is received, relative to the first slot, as described above in connection with FIG. 7.

Process 1000 may include additional aspects, such as any single aspect or any combination of aspects described below and/or in connection with one or more other processes described elsewhere herein.

In a first aspect, the retransmission is triggered when the second slot is a same slot as the first slot or the second slot occurs after the first slot.

In a second aspect, alone or in combination with the first aspect, the retransmission is not triggered when the second slot occurs before the first slot.

In a third aspect, alone or in combination with one or more of the first and second aspects, the HARQ-ACK information is received according to a HARQ-ACK codebook that is semi-statically configured.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
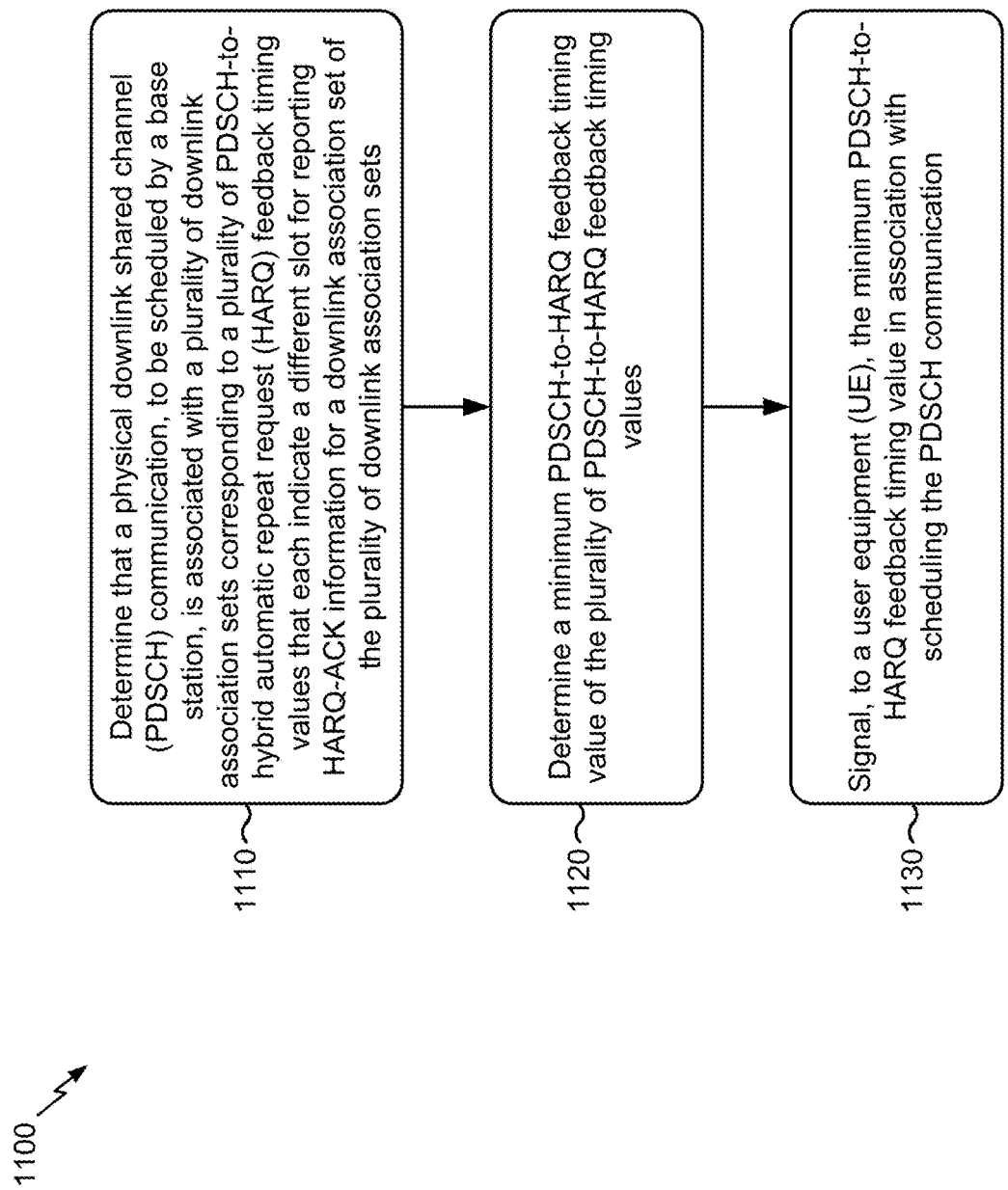

FIG. 11 is a diagram illustrating an example process 1100 performed, for example, by a base station, in accordance with various aspects of the present disclosure. Example process 1100 is an example where a base station (e.g., base station 110 and/or the like) performs operations associated with HARQ-ACK reporting for downlink communications included in multiple downlink association sets.

As shown in FIG. 11, in some aspects, process 1100 may include determining that a PDSCH communication, to be scheduled by the base station, is associated with a plurality of downlink association sets corresponding to a plurality of PDSCH-to-HARQ feedback timing values that each indicate a different slot for reporting HARQ-ACK information for a downlink association set of the plurality of downlink association sets (block 1110). For example, the base station (e.g., using controller/processor 240 and/or the like) may determine that a PDSCH communication, to be scheduled by the base station, is associated with a plurality of downlink association sets corresponding to a plurality of PDSCH-to-HARQ feedback timing values that each indicate a different slot for reporting HARQ-ACK information for a downlink association set of the plurality of downlink association sets, as described above in connection with FIG. 7.

As further shown in FIG. 11, in some aspects, process 1100 may include determining a minimum PDSCH-to-HARQ feedback timing value of the plurality of PDSCH-to-HARQ feedback timing values (block 1120). For example, the base station (e.g., using controller/processor 240 and/or the like) may determine a minimum PDSCH-to-HARQ feedback timing value of the plurality of PDSCH-to-HARQ feedback timing values, as described above in connection with FIG. 7.

As further shown in FIG. 11, in some aspects, process 1100 may include signaling, to a UE, the minimum PDSCH-to-HARQ feedback timing value in association with scheduling the PDSCH communication (block 1130). For example, the base station (e.g., using controller/processor 240, transmit processor 220, TX MIMO processor 230, MOD 232, antenna 234, and/or the like) may signal, to a UE, the minimum PDSCH-to-HARQ feedback timing value in association with scheduling the PDSCH communication, as described above in connection with FIG. 7.

Process 1100 may include additional aspects, such as any single aspect or any combination of aspects described below and/or in connection with one or more other processes described elsewhere herein.

In a first aspect, a PDSCH-to-HARQ feedback timing value other than the minimum PDSCH-to-HARQ feedback timing value is prevented from being signaled to the UE.

In a second aspect, alone or in combination with the first aspect, the HARQ-ACK information is received according to a HARQ-ACK codebook that is semi-statically configured.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    setting a value in hybrid automatic repeat request acknowledgement (HARQ-ACK) information to indicate a valid HARQ-ACK, corresponding to a physical downlink shared channel (PDSCH) communication, or a negative acknowledgment (NACK) based at least in part on a PDSCH-to-HARQ feedback timing value associated with the PDSCH communication,
        wherein the value is set to indicate the valid HARQ-ACK if the HARQ-ACK information is to be transmitted in a slot indicated by the PDSCH-to-HARQ feedback timing value,
        wherein the value is set to indicate the valid HARQ-ACK if the HARQ-ACK information is to be transmitted in a slot later than the slot indicated by the PDSCH-to-HARQ feedback timing value, and
        wherein the value is set to indicate the NACK if the HARQ-ACK information is to be transmitted in a slot that is earlier than the slot indicated by the PDSCH-to-HARQ feedback timing value; and
    transmitting the value in the HARQ-ACK information.

2. The method of claim 1, wherein the PDSCH communication is included in multiple downlink association sets, wherein HARQ-ACK information for different downlink association sets are to be reported in different slots.

3. The method of claim 1, wherein the valid HARQ-ACK is an ACK when the PDSCH communication is successfully decoded, or wherein the valid HARQ-ACK is a NACK when the PDSCH communication is not successfully decoded.

4. The method of claim 1, wherein the HARQ-ACK information is transmitted according to a HARQ-ACK codebook that is semi-statically configured.

5. The method of claim 1, further comprising:
    receiving the PDSCH-to-HARQ feedback timing value in downlink control information that schedules the PDSCH communication.

6. The method of claim 1, wherein the PDSCH-to-HARQ feedback timing value is pre-configured.

7. The method of claim 1, wherein the NACK is reported regardless of whether the PDSCH communication is successfully decoded.

8. The method of claim 1, wherein the NACK is reported before HARQ-ACK processing of the PDSCH communication is complete.

9. A method of wireless communication performed by a user equipment (UE), comprising:
    determining that a received physical downlink shared channel (PDSCH) communication is included in multiple downlink association sets, wherein hybrid automatic repeat request acknowledgement (HARQ-ACK) information for different downlink association sets is to be reported in different slots;

reporting a valid HARQ-ACK in a first slot indicated by a PDSCH-to-HARQ feedback timing value associated with the PDSCH communication; and selectively reporting the valid HARQ-ACK, corresponding to the PDSCH communication, or a negative acknowledgement (NACK) in a second slot based at least in part on whether the second slot occurs before the first slot, in a same slot as the first slot, or after the first slot, wherein the second slot is to be used for reporting HARQ-ACK information associated with a downlink association set of the multiple downlink association sets, wherein the valid HARQ-ACK is reported in the second slot if the second slot is determined to be the same slot as the first slot, wherein the valid HARQ-ACK is reported in the second slot if the second slot is determined to occur after the first slot, and wherein the NACK is reported in the second slot if the second slot is determined to occur before the first slot.

10. The method of claim 9, wherein the valid HARQ-ACK is an ACK when the PDSCH communication is successfully decoded, or wherein the valid HARQ-ACK is a NACK when the PDSCH communication is not successfully decoded.

11. The method of claim 9, wherein the HARQ-ACK information associated with the downlink association set is generated according to a HARQ-ACK codebook that is semi-statically configured.

12. The method of claim 9, wherein the PDSCH-to-HARQ feedback timing value is included in a set of preconfigured PDSCH-to-HARQ feedback timing values.

13. A method of wireless communication performed by a base station, comprising:

receiving a negative acknowledgement (NACK) in hybrid automatic repeat request (HARQ-ACK) information, wherein the NACK corresponds to a physical downlink shared channel (PDSCH) communication included in multiple downlink association sets;

determining a first slot indicated by a PDSCH-to-HARQ feedback timing value associated with the PDSCH communication; and selectively triggering retransmission of the PDSCH communication based at least in part on a timing of a second slot, in which the HARQ-ACK information is received, relative to the first slot, wherein the retransmission is triggered if the second slot is a same slot as the first slot, wherein the retransmission is triggered if the second slot occurs after the first slot, and wherein the retransmission is not triggered if the second slot occurs before the first slot.

14. The method of claim 13, wherein the HARQ-ACK information is received according to a HARQ-ACK codebook that is semi-statically configured.

15. The method of claim 13, wherein a size of a semi-statically configured HARQ-ACK codebook is determined based at least in part on one or more of:

a quantity of PDSCH-to-HARQ feedback timing values included in a preconfigured set of PDSCH-to-HARQ feedback timing values, a quantity of component carriers in a PUCCH group, an uplink-downlink time division duplex configuration, a supported quantity of nonoverlapped PDSCH per slot, a UE capability regarding a quantity of PDSCH that can be supported per slot, or a quantity of code block groups (CBGs) per component carrier.

16. A user equipment (UE) for wireless communication, comprising:

memory; and one or more processors operatively coupled to the memory, the memory and the one or more processors configured to:

set a value in hybrid automatic repeat request acknowledgement (HARQ-ACK) information to indicate a valid HARQ-ACK, corresponding to a physical downlink shared channel (PDSCH) communication, or a negative acknowledgment (NACK) based at least in part on a PDSCH-to-HARQ feedback timing value associated with the PDSCH communication, wherein the value is set to indicate the valid HARQ-ACK if the HARQ-ACK information is to be transmitted in a slot indicated by the PDSCH-to-HARQ feedback timing value, wherein the value is set to indicate the valid HARQ-ACK if the HARQ-ACK information is to be transmitted in a slot later than the slot indicated by the PDSCH-to-HARQ feedback timing value, and wherein the value is set to indicate the NACK if the HARQ-ACK information is to be transmitted in a slot that is earlier than the slot indicated by the PDSCH-to-HARQ feedback timing value; and transmit the value in the HARQ-ACK information.

17. The UE of claim 16, wherein the PDSCH communication is included in multiple downlink association sets, wherein HARQ-ACK information for different downlink association sets are to be reported in different slots.

18. The UE of claim 16, wherein the valid HARQ-ACK is an ACK when the PDSCH communication is successfully decoded, or wherein the valid HARQ-ACK is a NACK when the PDSCH communication is not successfully decoded.

19. The UE of claim 16, wherein the HARQ-ACK information is transmitted according to a HARQ-ACK codebook that is semi-statically configured.

20. The UE of claim 16, wherein the PDSCH-to-HARQ feedback timing value is pre-configured.

21. The UE of claim 16, wherein the one or more processors are further configured to:

receive the PDSCH-to-HARQ feedback timing value in downlink control information that schedules the PDSCH communication.

* * * * *